Figure 1:
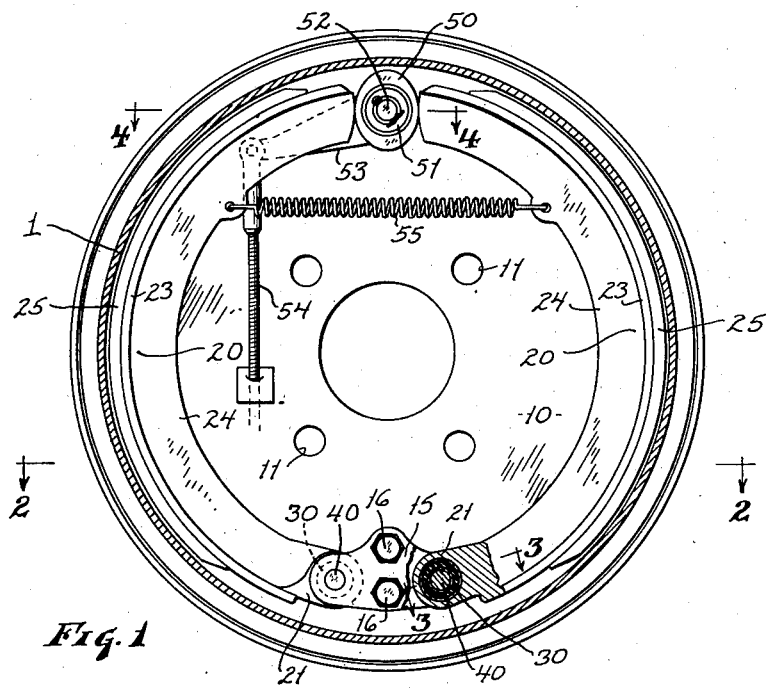

Aug. 8, 1944.   L. C. DANIELS   2,355,425
BRAKE
Filed April 9, 1942

INVENTOR.
Lee C. Daniels,
BY Dalis, Tears & McBean,
Attorneys

Patented Aug. 8, 1944

2,355,425

UNITED STATES PATENT OFFICE 2,355,425

BRAKE

Lee C. Daniels, Cleveland, Ohio, assignor to Sam Moore & Co., Cleveland, Ohio, a corporation of Ohio Application April 9, 1942, Serial No. 438,234

1 Claim. (Cl. 188—78)

This invention relates to a brake, preferably of the internal expanding type for automobiles and similar uses. The invention is concerned particularly with the means for pivotally carrying the movable brake shoes, the objects being to enable a perfect alignment at all times between the brake shoe and brake drum; to increase the brake surface available; to eliminate unnecessary wear of the brake shoe; to prevent squeak in the brake due to the turning of the shoe on its pivot; and to provide a shock absorber to reduce the wear on the pivot pin when the brake is applied.

In carrying out my invention, I provide a yielding bushing composed of rubber or similar yielding material lined on the inside by a metallic sleeve and covered on the outside by a metallic sleeve, both sleeves being in close contact with the yielding material. When the brake is assembled, the outer sleeve occupies a cylindrical opening in the brake shoe and makes a snug and binding fit with it, while the inner sleeve tightly surrounds the pivot pin. Thus, the relative rotating movement of the brake shoe about the pin is permitted only by the yielding of the mass of rubber within itself and not by any slipping of either the inner or outer sleeve. This eliminates the troublesome squeak which comes from metal moving on metal, and allows the brake shoe to contact with the drum for a greater arcuate distance than where the shoe is on a rigid pivot. It also presents a shock absorber between the shoe and the pin as the result of a gradual application of the thrust to the pin when the brake is applied.

In embodying my invention, I secure a bracket to the member which is to carry the shoe, the bracket having a transverse opening. The shoe is formed to overlap the bracket, and also has a transverse opening. I place in one of these openings the yielding bushing referred to and in the other member the pivot pin which snugly engages both that member and the bushing. This makes a hinge connection between the shoe and bracket with the movement confined solely to the rubber mass itself.

My invention is illustrated in the drawing hereof and is hereinafter more fully described and the essential novel features are summarized in the claims.

Figure 2:
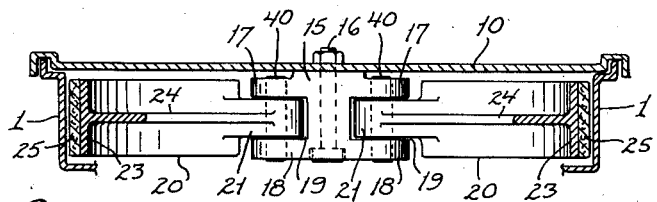
Figure 3:
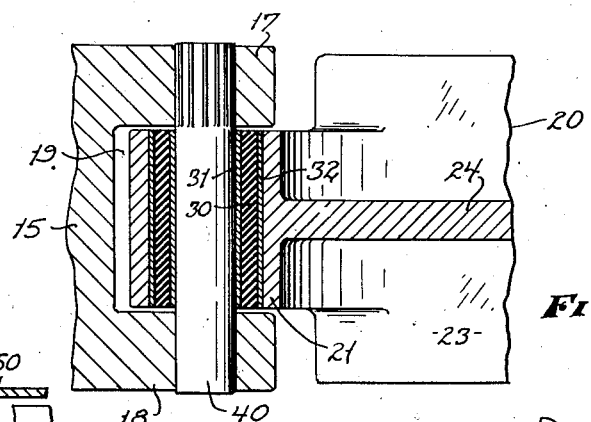
Figure 4:
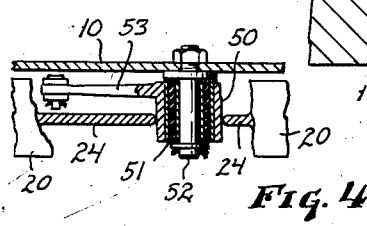

Fig. 1 illustrates my brake in vertical section through the brake drum; Fig. 2 is a cross section of the same in a plane indicated by the line 2—2 in Fig. 1; Fig. 3 is an enlarged fragmentary view of the bracket and one of the shoes, being a section on the line 3—3 in Fig. 1; Fig. 4 is a cross section along the axis of the brake-applying cam, as indicated by the line 4—4 on Fig. 1.

As shown in the drawing, 1 designates a suitable brake drum adapted to be carried, for instance, by an automobile wheel. 10 designates a plate carrying the brake shoes within the drum, the plate being shown as provided with holes 11 by which it may be bolted to a relatively stationary part of the automobile. Tightly secured to the plate 10 is a bracket 15 which carries the shoe pivots. This bracket is shown as bolted to the plate by two bolts 16. At each end the bracket is bifurcated to provide two pairs of ears 17, 18, leaving a space 19 between them, the ears having aligned openings for the pivot pin.

The brake shoes, indicated at 20, have reduced extensions 21, which extend into the spaces 19 of the bracket 15. The yielding bushing referred to comprises a rubber sleeve 30 having an inner metallic lining or sleeve 31 and an outer embracing sleeve 32, the two sleeves making a tight engagement with the rubber mass. This bushing is mounted in the reduced extension 21 of the brake shoe, and receives the pivot pin 40 which occupies the openings in the ears 17 and 18 of the bracket 15.

The shoe extension is reduced in width as shown, and is for the most part a cylindrical portion merging with a comparatively thin arcuate body portion 23 of the brake shoe and a thicker bracing web 24 of the shoe, as shown in Fig. 3. The outer sleeve 32 of the bushing has a drive fit within the cylindrical bore of the shoe extension. Likewise the pivot pin 40 has a drive fit in the inner sleeve 31 of the bushing and in the ears 17, 18 of the bracket 15, thus compelling any turning movement between the shoe and bracket to be only by the yielding of the rubber and not by any slipping of the shoe on the bushing or the bushing on the pin or the pin in the ears.

Each shoe is shown as having a facing 25 of usual character. To apply the brake, the shoes may be separated by any convenient mechanism acting to spread their free ends. I prefer, however, to provide a cam 50 rotatably mounted on the carrier plate and engaging the ends of the brake shoes, as shown in Fig. 1. In such preferable arrangement the cam is not a fixed pivot but is yieldingly mounted by reason of having a rubber bushing 51 within the cam surrounding the pivot pin 52 which is rigidly secured to the carrier plate 10. The cam is shown as having a projecting lever 53 to which an applying cable 54 is attached. A coiled tension spring 55 tends to pull the free ends of the shoes together, maintaining them normally out of contact with the brake drum 1.

The yielding mounting of the cam allows it to float, so to speak, between the ends of the shoes and thus equalize the force on the shoes as they separate. Such yielding application cooperates with the yielding pivots of the shoes to prevent squeaking in the application to the brake.

Whenever the brake is applied the yielding character of the two pivots of the shoes enables practically the entire shoe facing to engage the drum, thus causing a very effective braking action. This action is assisted, in case of inequality of the two facings, by the floating cam pivot. The engagement of the brake shoes throws a decided stress on the pivot pins of the shoes, but this stress is rendered gradually by reason of the yielding character of the pivots due to the bushings. Accordingly, I obtain perfect alignment at all times between the brake shoe and drum and the maximum braking area, and I also cushion the shock on the pivot pins, as well as prevent squeak as the brake is applied.

I claim:

In a brake, a brake drum, a bracket removably secured to said drum adjacent its periphery and having a pair of oppositely extending bifurcated arms, a pivot pin carried by each bifurcated arm and secured against movement relative thereto, a third pivot pin secured to said drum adjacent its periphery diametrically opposite said bracket, a brake mechanism mounted on said pins, said mechanism comprising a pair of brake shoe members, each having a brake facing rigidly secured thereto and having one end thereof disposed in the bifurcation of its respective bracket arm, an operating cam member mounted on said third pin and positioned between the free ends of said shoes, and a spring interconnecting said shoes to retain them in contact with said cam, there being a bushing disposed between each pin and its coacting brake mechanism member, each bushing comprising a yielding sleeve of rubber-like material tightly embraced between inner and outer metallic sleeves, the inner sleeves being in tight non-slipping engagement with said pins and the outer sleeves in tight non-slipping engagement with their respective brake members, said brake mechanism being spaced from said drum in all regions apart from the engagement of said bushings with the drum, whereby all vibrations of said brake mechanism are absorbed by said bushings.

LEE C. DANIELS.